(12) United States Patent
Talmon-Gros et al.

(10) Patent No.: US 9,591,874 B2
(45) Date of Patent: Mar. 14, 2017

(54) MOLD FOR FORMING AT LEAST ONE FOOD PRODUCT

(75) Inventors: Michael Talmon-Gros, Grenzach Wyhlen (DE); Bernard Rocklage, Buehl (DE); Rudolf Hauger, Rheinfelden (DE)

(73) Assignee: Kraft Foods R & D, Inc., Deerfield, IL (US)

( * ) Notice: Subject to any disclaimer, the term of this patent is extended or adjusted under 35 U.S.C. 154(b) by 690 days.

(21) Appl. No.: 13/979,257

(22) PCT Filed: Jan. 11, 2012

(86) PCT No.: PCT/US2012/020903
§ 371 (c)(1),
(2), (4) Date: Sep. 18, 2013

(87) PCT Pub. No.: WO2012/097043
PCT Pub. Date: Jul. 19, 2012

(65) Prior Publication Data
US 2014/0001666 A1    Jan. 2, 2014

(30) Foreign Application Priority Data

Jan. 12, 2011  (EP) .................................. 11150703

(51) Int. Cl.
*A23P 1/10*     (2006.01)
*A23G 1/22*     (2006.01)
*A23G 3/34*     (2006.01)
*A23G 3/02*     (2006.01)

(52) U.S. Cl.
CPC ............... *A23P 1/105* (2013.01); *A23G 1/22* (2013.01); *A23G 3/0025* (2013.01); *A23G 3/0031* (2013.01); *A23G 3/0268* (2013.01); *A23P 30/00* (2016.08); *A23P 30/10* (2016.08)

(58) Field of Classification Search
CPC ..................................................... A23P 1/105
See application file for complete search history.

(56) References Cited

U.S. PATENT DOCUMENTS 5,970,735 A   10/1999   Hobelsberger
5,984,716 A   11/1999   Starkey
(Continued)

FOREIGN PATENT DOCUMENTS

DE   102004012580 A1   9/2005
EP       1676485 A1    7/2006
(Continued)

OTHER PUBLICATIONS

International Search Report dated Apr. 24, 2012 for PCT/US2012/020903.

*Primary Examiner* — Larry Thrower
(74) *Attorney, Agent, or Firm* — Fitch, Even, Tabin, & Flannery LLP

(57) ABSTRACT

A mold for forming at least one food product with a measurement unit, wherein the mold has a filling side and a back side opposite to said filling side. Further, the measurement unit comprises: measuring means configured to measure at least one parameter while the mold is used in a production line or testing facility and a data transfer interface configured to transfer data to an external processing unit.

11 Claims, 2 Drawing Sheets

(56) References Cited

U.S. PATENT DOCUMENTS

2004/0258787 A1* 12/2004 Olaru .................... B22D 17/32
425/143
2012/0058213 A1* 3/2012 Lindee ................ A22C 7/0038
425/135

FOREIGN PATENT DOCUMENTS

| WO | 9412046 A1 | 6/1994 |
| WO | 9834773 A1 | 8/1998 |
| WO | 02051265 A1 | 7/2002 |
| WO | 2006014227 A2 | 2/2006 |

* cited by examiner

MOLD FOR FORMING AT LEAST ONE FOOD PRODUCT

CROSS-REFERENCE TO RELATED APPLICATIONS

This application is a U.S. national phase application of International Application No. PCT/US2012/020903, filed Jan. 11, 2012, designating the United States, which claims benefit from European Application No. 11150703.4, filed Jan. 12, 2011, both of which are hereby incorporated herein by reference in their entirety.

FIELD OF THE INVENTION

The invention relates to a mold with at least one depression for forming food products that is at the same time configured for optimizing the design of the mold, the production line and/or the production process. Said mold has a filling side that is open to be filled with at least one food mass and/or at least one food product ingredient and a back side opposite to said filling side.

BACKGROUND OF THE INVENTION

Molds are efficient tools in order to give food products a specific form. Due to their essential role during the production process, i.e. they pass through a significant number of production stages, they are exposed to various mechanical, ambient (such as thermal) and chemical influences. For example, if the food products are removed by knocking the mold, the mold may have to withstand significant accelerations. When the mold is cleaned after production in a washing cycle, the mold is within an environment strongly influenced by chemicals that assist in cleaning the mold for the next production cycle. Here, the chemicals may have the potential to deteriorate the mold's material and therefore cause damage to the mold in the long run. In addition to mechanical and chemical loads, the ambient conditions surrounding the mold change significantly as well. After filling the mold, the mold may well be cooled down to temperatures below 0° C. in order to achieve a fast solidification of the food product. After the removal of the food product, the mold may be directly transferred to the washing process that normally requires temperatures of about 50° C. to 75° C. In other words, molds can be exposed to a substantial change in temperature during a short period of time.

Although many parameters may be used to optimize the production process, the extent to which they influence the state and integrity of the mold is not generally known. The hygienic requirements that have to be fulfilled according to the rules set out for the food industry narrows down the choice of materials during the design phase of such a mold to the materials certified for such a use. In other words, the best material and design to withstand the conditions the mold is exposed to during the production process may not be legitimate for use with food products.

Due to the repetitive use of molds during the production process, at some point problems such as fatigue may have negative effects on the production process. For example, a common failure is chipped-off pieces of the mold's material. This bears the risk that parts of the chipped-off material ends up within a food product. Therefore, in such cases, the production process is brought to an immediate halt. As a consequence, the food products that have been formed during the chipping-off have to be discarded, and the production line has to be checked for any residual pieces of material left within the machinery. Since it is hard to determine when the mold got damaged, a large number of food products may contain pieces of broken off material and the entire production run may have to be discarded to avert any risks to the health of the consumers. Only after such procedure, the production may continue. These safety measures result in a delay of the production and therefore in undesirable additional costs.

In order to avoid such costs, the molds are designed with high safety factors, leading to molds that are bigger in size and therefore heavier and harder to move. In addition, the lack of detailed knowledge concerning loads and the environmental influences acting on such a mold results in a rather empirical design principle. Hence, there is a need for optimization of the design of the mold and/or the production line and/or the production process to avoid the occurrence of failures of the mold during production such as chipped-off material due to fatigue and/or high loads.

Therefore, a first way to avoid structural problems with the molds is by optimizing their design. As laid out above, this option can not be fully exploited up to now due to the lack of knowledge about the loads acting on such a mold during production since sensors utilized for food production only register the state of the food product in the mold such as the temperature or the viscosity.

A second way is to develop means to detect a failure of the mold's material. For example, the German patent application DE 10 2004 012 580 A1 uses a camera and image recognition to determine if all food products were removed from a mold. Although this technology may be applied to monitor the integrity of the molds, such a technique is in general stationary and therefore limited to only one stage of the production.

Thus, DE 10 2004 012 580 could for example be used for the process and assembly for producing a confectionery product disclosed in EP 1 676 485 A1, which forms the basis for the two-part form of independent claim 1. EP 1 676 485 A1 describes an injection-molding device for molding a confectionery product which is shaped on all sides. It can be produced by (i) preparing an aerated sugar mass, (ii) injecting said mass in a mould cavity defined by two separable mold surfaces having a temperature below 0° C., and (iii) separating the mold surfaces and removing the product.

SUMMARY OF THE INVENTION

The objective of the invention was therefore to provide the means that allows optimizing the design of a mold for food products, the corresponding production line and/or the corresponding production process.

The present invention solves the above mentioned issues by providing a mold, an apparatus, a method and a use in order to collect and transfer data describing the state of the mold. This solution is brought forward by the subject matter of the independent claims, wherein the dependent claims describe further aspects of the invention.

In a first aspect of the invention, a mold for forming at least one food product is equipped with a measurement unit. The mold has a filling side and a back side opposite to said filling side. Further, the measurement unit comprises measuring means configured to measure at least one parameter of the mold while the mold is used in the production line or testing facility. Further, the unit comprises a data transferring device configured to transfer data to an external processing unit. Preferred food products are confectionery products (including chocolate, candy, chewing gum and ice-cream), bakery products (including bread, cakes, pastries and dough) and/or dairy products (including cheese).

The measurement unit of the mold facilitates data acquisition directly at the point of interest, namely the mold itself. Further, the mold may acquire and/or transfer the data on-line and in real time. In one embodiment, the measurement unit may only comprise measuring means, i.e. one or more sensors, and a data transferring device. Therefore, the design of the measurement unit can be kept simple and compact. This has the advantage that such a measurement unit only requires a small installation space for passing through the different production steps together with the mold. This architecture of the measurement unit also allows for a robust design that is more fit to endure the production environment and, therefore, offers a longer life-time and higher reliability. The data transfer interface makes it possible to outsource at least parts of the data processing and therefore further reduces the size of the device. The resulting measurement unit is small and has only few parts that are exposed to the measurement environment and that have to be protected to avoid malfunctions. However, if a malfunction occurs, it is also easy to exchange such a device due to its size and at a low cost.

In another embodiment of the invention, the measuring means comprise at least one sensor that measures mechanical parameters such as stress, strain, acceleration, orientation, velocity and/or force. The sensor or sensors may apply capacitive and/or resistance working principles. For example, strain and stress may be measured using at least one strain gauge, which in another embodiment are directly attached to the mold and protected by a protective layer, if necessary. Other examples are gyro sensors measuring the orientation of the mold, acceleration sensors and/or force sensors, measuring the acceleration or force of the mold, respectively, in at least one translational and/or rotational axis. Although in all these examples, the sensors are preferably in direct contact with the mold, it is also possible to use sensors that apply a non-contact measurement principle such as ultrasound or laser. The latter enables, for example, the measurement of the velocity and/or position of the mold.

Which parameters or which combination of parameters is measured, depends on the objective of the measurement. In one embodiment of the invention, the measuring means is configured to measure at least one parameter of the structure or structural integrity of the mold. Additionally and or in another embodiment, it might be of interest to measure accelerations that occur in the demolding station, for example a mold knockout station, where the at least one food product is removed from the mold. In the twisting station this measurement may be complemented with a measurement of the orientation of the mold. A person skilled in the art will appreciate that it may also be advantageous to choose a combination of sensors that make it possible to identify certain events such as twisting or rotating the mold during production in order to draw conclusions concerning the cause and effect of certain production stages on the mold. It might also be desirable to investigate the interrelationship between multiple parameters. For example, measuring the temperature that the mold is exposed to during production may be useful to explain parts of the stresses and strains occurring within the mold's material.

According to another embodiment of the invention, the measuring means comprise at least one sensor, or in some embodiments multiple sensors, to measure ambient parameters such as pressure, temperature, humidity and/or light. As explained above, changes in temperature may cause thermal stress within the mold. Humidity on the other hand might affect the heat transfer that occurs to the mold, for example when washing said mold, and therefore indirectly determines the temperature affecting the mold. Light (such as infrared light or UV light) could be used during production and may well have adverse effects on the mold's material and therefore on the structural integrity of the mold.

In another embodiment of the invention, the measuring means comprise at least one and in some embodiments multiple sensors to measure one or more chemical parameters such as partial pressures of gases, sugar content, viscosity, fat content, protein and/or pH-value. Although at first sight, these parameters seem to reflect only the quality of the food product itself, they may also have an effect on the longevity of the mold. Certain gases may affect the mold's material and therefore their quantification might be useful to estimate the environmental influences the mold is exposed to. Another example is the pH-value, since it represents a typical parameter that might have adverse effects on the mold's materials.

In one embodiment of the invention, the measurement means are configured to withstand or measure acceleration within a range of 0 to 30 G and/or temperatures within a range of −50° C. to 120° C. High acceleration occurs, for example, when the food products are knocked out of the mold in a mold knockout station, acting as demolding station. However, such accelerations may also occur when the mold is transferred from one production station to the next caused by the transport means. Therefore, the ability to withstand such influences without a negative effect on the measurement is crucial. During the production of food products, the different production stages may require a wide range of temperatures that the measurement unit is exposed to during measurement. This range comprises low temperatures such as below 0° C. to cool down the food product after filling the at least one food mass into the mold, or rather high temperatures, for example occurring during filling or washing and disinfecting the mold.

In addition, the measurement unit may be protected from the measurement environment by at least one protective layer such as a sealing layer. Here, it is especially important that the protective layer does not affect the measurement in an undetermined way. This embodiment of the invention especially takes the effects of the measuring environment on the measurement unit into account. The protective layer around the measurement unit is especially useful when the mold is washed since it may be hard to find a location where the measurement unit is reliably protected from the measurement environment so no malfunction of the unit occurs. It may be advantageous to design the protective layer in a way that it also forms a housing for the measurement unit in order to simplify the attachment of the measurement unit to the mold.

In another embodiment of the invention, the measurement unit is attached to or removably attached to said mold, preferably to the back side of the mold. Further, the measurement unit may have a modular design in order to connect different measuring means. Such a modular design enables a wide range of different options to measure the at least one parameter that can be custom fit to each particular question concerning the loading of the mold. Further, the modular design allows for an optimum placement of the sensors on the mold. If the optimum placement for multiple potentially different sensors is at several locations on the mold, the measurement unit may well be separated into a main unit comprising the data transfer interface and optionally at least one measuring means and at least one auxiliary unit comprising at least one measuring means connected to the main unit. This is especially the case if multiple strain gauges are applied to the mold in order to determine occurring strain at different locations of the mold in order to estimate the loads acting on said mold during production or testing. Another exemplary application may be the attachment of several acceleration sensors in order to optimize the effectiveness of the mold knockout station at different locations of the mold in order to quickly and reliably remove the food product from the mold.

In a further embodiment of the invention, the processing unit is connected to a control system for controlling the production line or the testing facility. Integrating the measurement unit in such a way allows optimizing the production process for the food product beside the aforementioned improvement of the design of the mold and the production line. For example, the cooling of the molds when containing a food product can be closely supervised in order to better understand how fast heat is transported away from said product during solidification of the food mass. Another example may be the objective to achieve a threshold temperature of the mold during the washing process in order to guarantee that the mold fulfills all hygiene requirements before entering production.

Up to now, it usually takes too long before a defect in a mold is discovered, which in turn causes high additional costs that could be reduced by decreasing the response time to such an event. Therefore, it may also be of interest to monitor those parts of the mold that are susceptible to be damaged in order to enable a fast response if, for example, material of the mold chips off. This solves the issue of having to discard a complete production run of food products in order to assure that no chipped-off parts of the mold remain within these products, representing a potential danger for the consumer.

In another embodiment of the invention, the data transfer interface comprises a wireless and a plug connection for transferring the measurement data. The transfer of the data may take place during and/or after the collection of the data from the measuring means. If seen as necessary, a data logging unit may be added to the measurement unit as an integrated or modular entity. Which architecture is chosen for the measurement unit depends on the task the measurement unit has to fulfill. For example, if the measurement unit is intended for optimizing the design of the mold, a plug connection for transferring the data after the measurement has taken place may well be sufficient and results in an advantageously simple design of the unit. On the other hand, if the measurements are used to control or monitor the production process or the mold at least during a set time period, a constant transfer of data during production may well be the better operation mode for the measurement unit. In another embodiment, probably in combination with the aforesaid, it might be of advantage to also design the data transfer interface as a module in order to ensure an easy and reliable transfer of measurement data.

In another embodiment of the invention, the measurement unit further comprises a data logging unit to record the measurement data received from the measuring means. Such a data logging unit has the advantage that data measured while passing through production or testing can be read out after at least parts of the production or testing have been finished. In order to do so, the data logging unit may be easily connected to a processing device such as a computer for the subsequent data analysis by cable or wireless connection. This provides a cost effective way to collect data of the loads affecting the mold during production or testing.

In another embodiment of the invention, a food production line comprises a mold as described above that is passed through at least one of the following production line stations or testing facility stations such as a mold filling station, a mold washing station, a mold twister station, a mold rotator station, a mold cooling tunnel, and/or a demolding station. All these stations are production stations that fulfill tasks commonly found for the production of food products. Adapting the architecture of the measurement unit to provide optimum functionality for at least one of these stations ensures that only data that can subsequently be used for optimizing the design of the mold and production line and/or the production of food products is acquired. The insight that this data delivers, ensures that the design of the molds and the production lines becomes less empirical since it is based on analytical results of common engineering techniques such as finite element modeling.

According to the aforementioned, the mold is intended for use in a food production line and/or testing facility. This is especially important, because molds for producing food products have special requirements such as they have to be biocompatible and have to fulfill hygienic requirements, i.e. it has to be possible to disinfect them.

In a further embodiment of the invention, the mold further comprises identification means to distinguish the at least one mold equipped with a measurement unit from other molds used in the production. Hence, one or more molds that are equipped with measurement units may be passed through the production line. For the optimization of the mold design it may well be sufficient to pass the mold through the at least one production step without filling the mold. If the measurement mold is used among at least one other production mold that is fully integrated in the production process, i.e. it used for the production of the food product, it is desirable to equip at least the measurement mold with identifying means. These identifying means, such as transponders or markings, facilitate the manual and/or automatic distinction between a normal production mold and the measurement mold. This makes it possible to selectively skip production steps such as the filling of the mold.

For producing a food product while using a mold as described above, a related method has been developed. In a first aspect of this method for producing at least one food product comprising a mold, the method includes several steps. One step is starting the measurement of the at least one parameter with the measurement unit. Once at least parts of the at least one parameter has been obtained, another step is to stop the measurement. Further, the at least one parameter is measured while the mold is passed through at least one production line station or testing facility station in which at least one production step is performed.

According to another embodiment of the invention, the method of producing the at least one food product comprises at least one production step at least once. Such a step is filling the mold in a mold filling station with at least one food mass and/or at least one food product ingredient such as particulate material. Another step is washing the mold in a mold washing station before and/or after the mold is filled in at least one filling station in order to remove remaining food products or remainders of food products from the mold. Further, twisting the mold in a mold twister station at least once, preferably to remove the at least one food product or to reorient said mold for another production step may also be performed. Another step in the production of the at least one food product is cooling the mold in a mold cooling tunnel, preferably with at least parts of the food product within the mold, in order to speed up the solidification process of the food mass and/or the food product ingredient after the mold has been filled. A technique for removal of a food product is passing the mold through a demolding station to separate the food product from the mold. An example for such a demolding station is a mold knockout station in which the mold is knocked in order to remove the at least one food product. In other words, the food product is removed by accelerating the mold in at least one direction. Another technique to remove the food product is to loosen the at least one food product by vibrating the mold. Further, a combination of these techniques may also be applied.

Further, passing the mold through more than one production station may be especially useful if the objective of the measurement is to record the loading cycle for parts of or a complete production cycle.

It is also within the scope of the invention to start and stop the measurement of the at least one parameter at least once during, before and/or after the production process. This is advantageous if data is to be recorded only at set time intervals, for example, if only certain stages in the production are to be monitored or investigated. This avoids sorting out the data after each measurement in order to reduce the recorded data points to the ones of interest in case data has been recorded during the whole production cycle.

Another embodiment of said method is to transfer the measurement data from the measurement unit to an external processing unit with a data transfer interface in order to control the production process and/or to improve the design of at least parts of the production line or the testing facility. Although the data acquired in this manner is best fit for improving the design of the mold, it might also be useful to improve the design of other parts of the production line. For example, it is possible to improve the production by optimizing the precision or the path of the molds through the production steps. It also becomes possible to investigate the time intervals of certain steps during production such as the washing of the mold or cooling of the mold to save production time.

In a further embodiment of the method, the measurement data is transferred simultaneous to and/or after the at least one production step. Including such a task in the production method is especially useful when data acquired with said mold is to be used for directly controlling or monitoring the production process and/or the mold. This is the case if the mold has to reach a certain temperature during the cooling process before it can be transferred to the next production step. Another example is the heating of the mold during a washing cycle in order to fully remove remaining chocolate mass and/or food product ingredients in said mold after removal of the at least one food product.

DETAILED DESCRIPTION OF PREFERRED EMBODIMENTS

Figure 1:
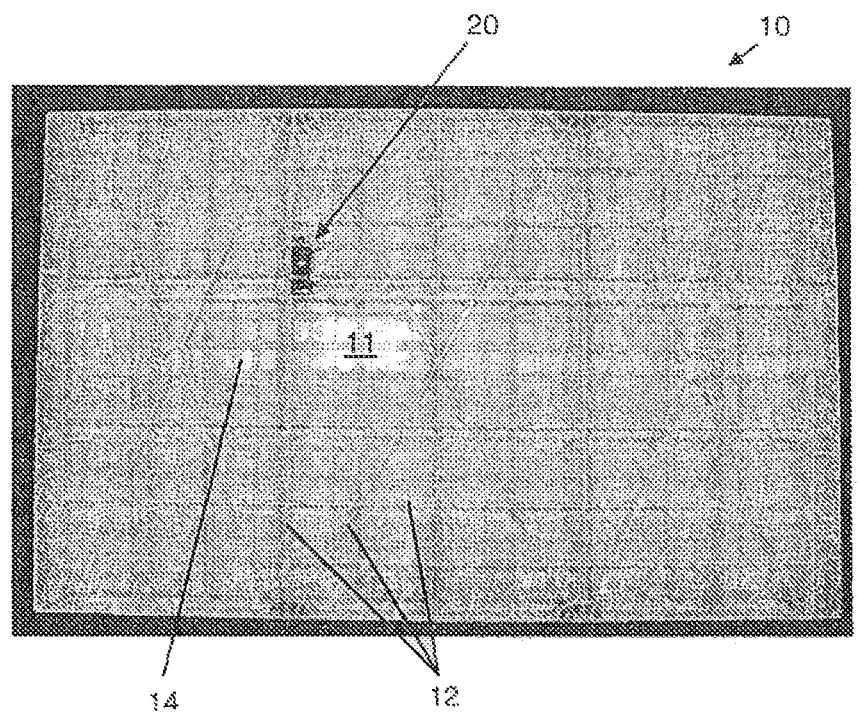
FIG. 1 shows a mold comprising a measurement unit.

FIG. 1 shows a mold 10 for food products with a measurement unit 20 attached to it. The mold 10 has multiple depressions 14 with a specific shape for forming chocolate bars. The chocolate bars may well contain another food product ingredient such as a particulate material, for example, nuts and/or raisins. Although the mold 10 is for the production of chocolate bars, the invention may also be applied to molds for other food products such as pralines or ice-cream. The mold 10 is structurally reinforced with reinforcing means, preferably at least one rib 12, on its back side 11.

The measurement unit 20 is attached to the back side 11 of a rectangular mold 10, located approximately one third of the mold's side length away from the boundary, respectively. The measurement unit 20 is preferably smaller in one of its dimensions than the height of the ribs 12 so that the mold 10 could be put on its back side 11 on a plain surface without the measurement unit 20 touching said surface.

Measurement unit 20 may be attached to at least one mold 10 during normal production in order to facilitate the optimization of the design of said mold 10, the design of at least part of a production line and the optimization of the production process. The measurement unit 20 is preferably attachable and detachable from said mold 10. However, it is also within the scope of the invention to integrate the measurement unit 20 into the mold 10, for example to be part of the reinforcing means or the depressions 14. Although measuring means, a data transfer interface 26 and a data logging unit are integrated within the measurement unit 20, it has a very compact built (FIG. 1).

Figure 2:
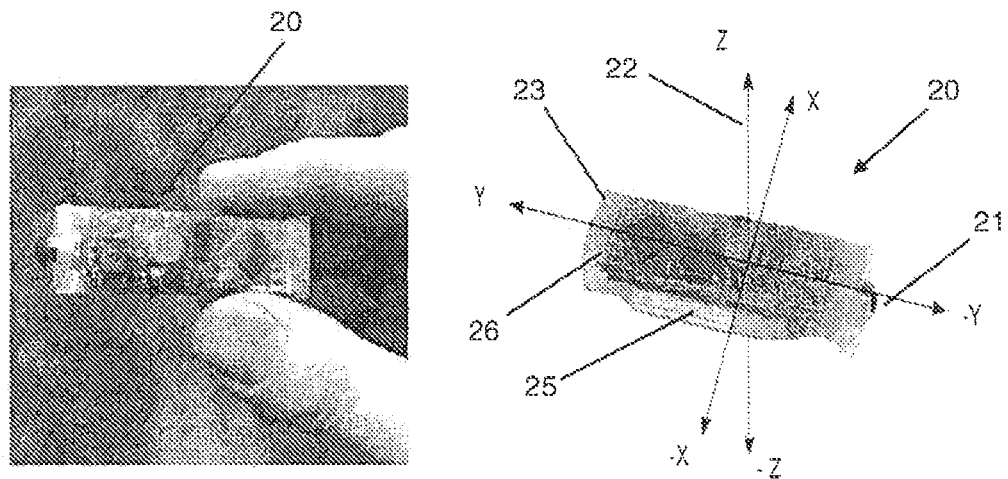
FIG. 2 shows the measurement unit in more detail.

FIG. 2 shows a more detailed view of the measurement unit 20 that comprises an integrated circuit board 24, a data transfer interface 26 attached to said circuit board 24, a protective layer 23 configured to protect the measurement unit 20 from the measurement environment, a switch 21 to activate or deactivate the acquisition of the at least one parameter and an energy supply 25 such as a battery. The measurement unit 20 further has a local coordinate system 22 linked to an acceleration sensor thereon. The measurement unit 20 may also contain at least one additional sensor, for example a temperature sensor and/or a sensor to detect humidity. In this exemplary architecture of the measurement unit 20, the data transfer is performed by the data transfer interface 26 by a cable connection after at least parts of the measurement has taken place. However, it is just as easy to add a wireless data transfer to the data transfer interface 26 or to replace it altogether.

In order to start the measurement, the measurement unit 20 is activated. This may be achieved by using a simple switch 21 or by remote control. In order to exchange commands between a remote control and the measurement unit 20, the wireless data transfer interface may be used or an integrated additional remote control unit. The remote control allows to turn the data acquisition of the measurement unit 20 on and off at least once, for example, to only acquire data of specific production steps. Another possibility is to program the measurement unit 20 at which time intervals and/or sampling rates the measurement unit 20 should record and/or transfer data from the measuring means.

The measurement may be started before the mold 10 enters the production process as well as at a point of time after the mold 10 entered the production process or at multiple times during the production. Once the measurement is started, the measurement unit 20 records the at least one mechanical, chemical and/or ambient parameter. The resulting data points are either logged by a data unit and/or may be transferred in real-time while the data is recorded. It is also an option of the present invention to specifically collect data for specific parameters by only activating the corresponding measuring means. In other words, only the measuring means required in order to fulfill the measurement task, such as investigating the loads acting on the mold 10 in at least one production station, are activated when starting the measurement.

During measurement, the protective layer 23 seals off parts of the measurement unit 20 that are susceptible to the measurement environment. The measuring means may be completely integrated into said measurement unit 20 and/or may also have a modular architecture. A modular architecture is for example advantageous if it is desirable to place the measuring means at different locations of the mold 10 to ensure an optimal data acquisition. In case of a modular architecture of the measurement unit 20, the measuring means might either be connected by cable connection and/or wireless connection. The latter has the advantage of an easier installation. The location for the measuring means has to be chosen according to the task on hand. For example, in order to perform a measurement of the acceleration the mold 10 is exposed to, the measuring means should not be placed at an instantaneous center of rotation of the mold 10. If such a placement cannot be avoided, more than one acceleration sensor may be used or more than one measurement cycle can be performed. As a person skilled in the art will appreciate, multiple sensors have to be used as well for recording stress fields, strain fields, temperature fields, humidity fields and/or force fields. In order to directly acquire data about the strains and stresses within the mold 10 during production, additional strain gauges may be connected to the measurement unit 20 (not shown).

Figure 3:
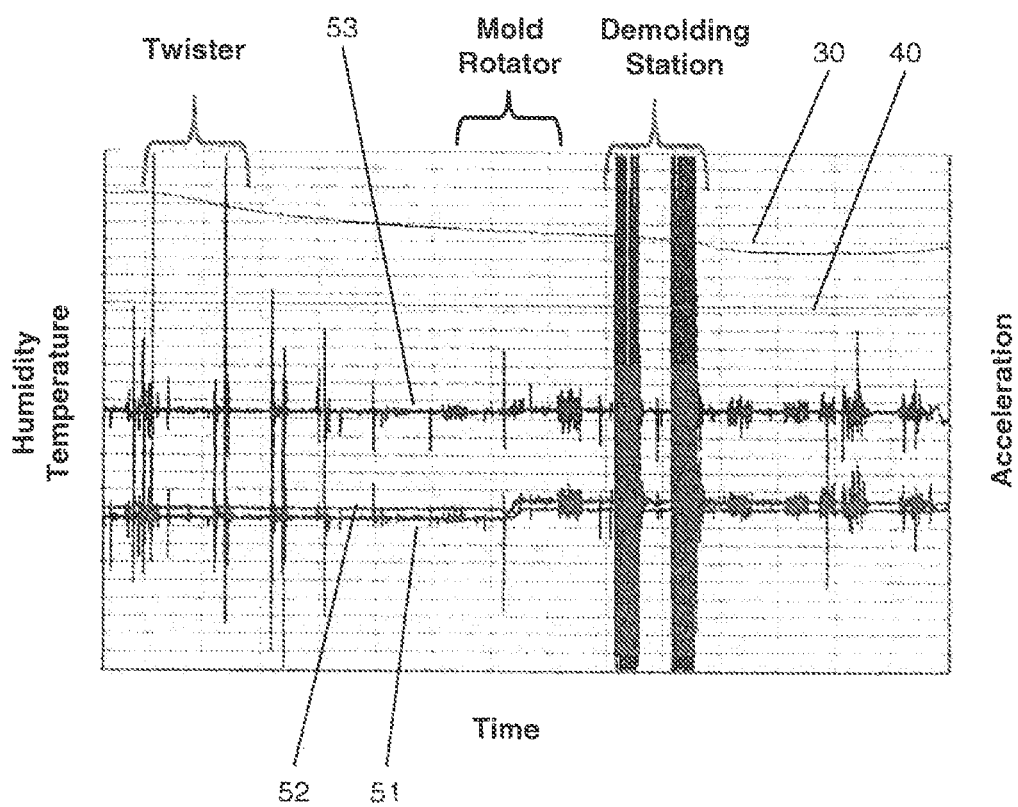
FIG. 3 shows a graph with measurement results acquired with the mold.

FIG. 3 shows post-processed measurement results of a measurement unit 20 after the mold 10 has passed through several production stations, namely a twisting station, a mold rotator station as well as a demolding station, respectively, mold knockout station, and has been transported between these stations by transporting means. As can be appreciated in FIG. 3, during the time of measurement, the acceleration over time in all three translational axes (51, 52, 53) as well as humidity 30 and temperature 40 have been recorded. The temperature is approximately constant throughout the whole measurement, wherein the humidity 30 decreases over time with a slight increase at the end. The measurement of the acceleration shows peaks that either corresponds to the twister station, the mold rotator or the demolding station. Further there is unsteady movement of the mold 10 between these production stations while the mold 10 is transported by the transporting means. In order to exactly determine the reasons for the unsteady movement of the mold 10, the measurement cycle may be repeated several times and/or measuring means may be added that record the exact position of said mold 10 that can later on be related to the occurrence of unsteady movement.

After stopping the measurement, again by using a normal switch 21 and a remote control, the data can be post-processed for subsequent use, for example by applying common engineering techniques such as finite element analysis or boundary analysis. Further, other analysis techniques such as frequency analysis may be used, for example, to detect if material has been chipped off the mold 10 and therefore changed the frequency profile of said mold 10.

The measurement data may also be used to control the production process on-line and in real-time at least by monitoring the state of the mold 10 during production during set time intervals that are, for example, found to be critical for the integrity of the mold 10.

In summary, the new and inventive way to measure the state of the mold 10 during the production of food products provides the means to reliably and quickly provide data by measuring at least one parameter delivering objective valuable information. This information may be used for the design of new molds or the retrofit of existing molds. For the latter case, said measurement unit 20 can be attached to a mold 10 that shows, although carefully designed, unexpected behavior such as unwanted vibrations during production. The analysis of the acquired data makes it possible to point out the weak spots of such a mold 10 and therefore solves occurring problems with existing molds without having to design complete new ones.

Recording chemical parameters such as the pH-value may also help to optimize the mold 10, the production line and/or the production process. This is for example the case for a mold washing station in order to determine how much the washing liquid changes the pH-value the mold 10 is exposed to. For such a purpose, the measuring means may well be attached to the front of the mold 10 or be integrated within the mold 10 so that they are in contact with the front side of the mold 10, for example by being part of the surface of the depression 14 within the mold 10.

The invention claimed is:

1. A mold for forming at least one food product, the mold comprising a measurement unit, a filling side, a back side opposite to the filling side, and an identification device to distinguish the mold from other molds used in a production line or testing facility, the measurement unit further comprising:
   a measuring device configured to measure at least one parameter of the mold while the mold is used and passed through a production line or testing facility; and
   a data transfer interface configured to transfer measurement data to an external processing unit,
   wherein the measuring device comprises at least one sensor configured to measure at least one of partial pressures of gases, sugar content, viscosity, fat content, protein, and pH-value of a food product in the mold, and wherein the processing unit is connected to a control system for controlling the production line or the testing facility.

2. The mold according to claim 1, wherein the measuring device comprises at least one sensor to measure mechanical parameters selected from the group consisting of: stress, strain, acceleration, orientation, velocity and force.

3. The mold according to claim 1, wherein the measuring device comprises at least one sensor to measure ambient parameters selected from the group consisting of: pressure, temperature and humidity.

4. The mold according to claim 1, wherein the measuring device is configured to withstand or measure acceleration within a range of 0 to 30 G and/or temperatures within a range of −50° C. to 120° C. and the measurement unit is protected by at least one protective layer.

5. The mold according to claim 1, wherein the measurement unit is attached to the mold and the measurement unit has a modular design for connection of different measuring devices.

6. The mold according claim 1, wherein the data transfer interface comprises at least one of a wireless connection and a plug connection for transferring the measurement data during and after the collection of data from the measuring device.

7. The mold according to claim 1, wherein the measurement unit further comprises a data logging unit to record the measurement data.

8. The mold of claim 5, wherein the measurement unit is removably attached to the back side of the mold.

9. A mold for forming at least one food product, the mold comprising:

a filling side;
a back side opposite the filling side; and
a measurement unit comprising:
    a measuring device configured to measure at least one parameter of the mold as the mold passes through a production line or testing facility; and
    a data transfer interface configured to transfer measurement data to an external processing unit that is connected to a control system that controls the production line or testing facility; and
wherein the measurement unit is attached to the mold and the measurement unit has a modular design that allows for the connection of different measuring devices to the mold.

10. The mold according to claim 9, wherein the measuring device comprises at least one sensor to measure chemical parameters selected from the group consisting of: partial pressures of gases, sugar content, viscosity, fat content, protein, and pH-value of a food product in the mold.

11. The mold according to claim 9, further comprising an identification device to distinguish the mold from other molds used in the production line or testing facility.

\* \* \* \* \*